United States Patent Office 2,956,474
Patented Oct. 18, 1960

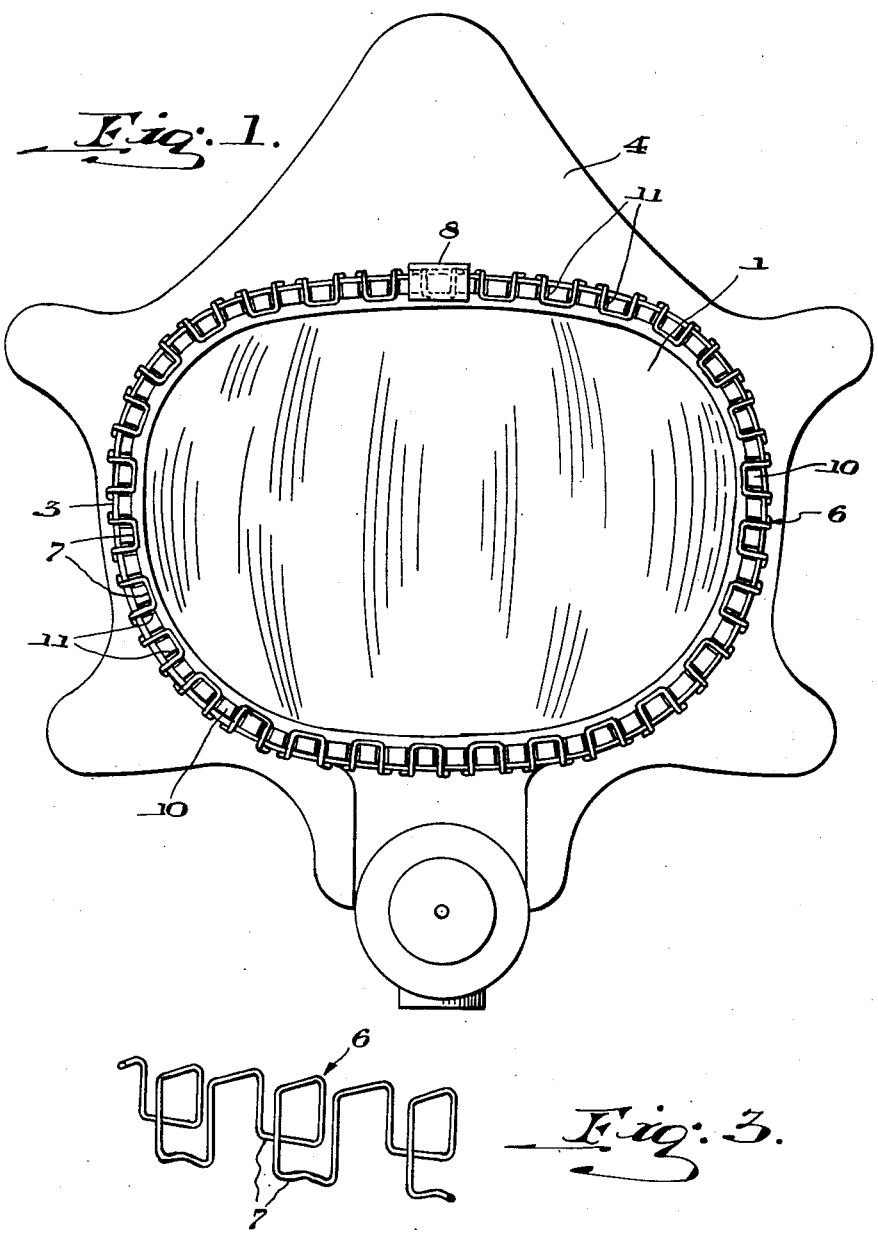

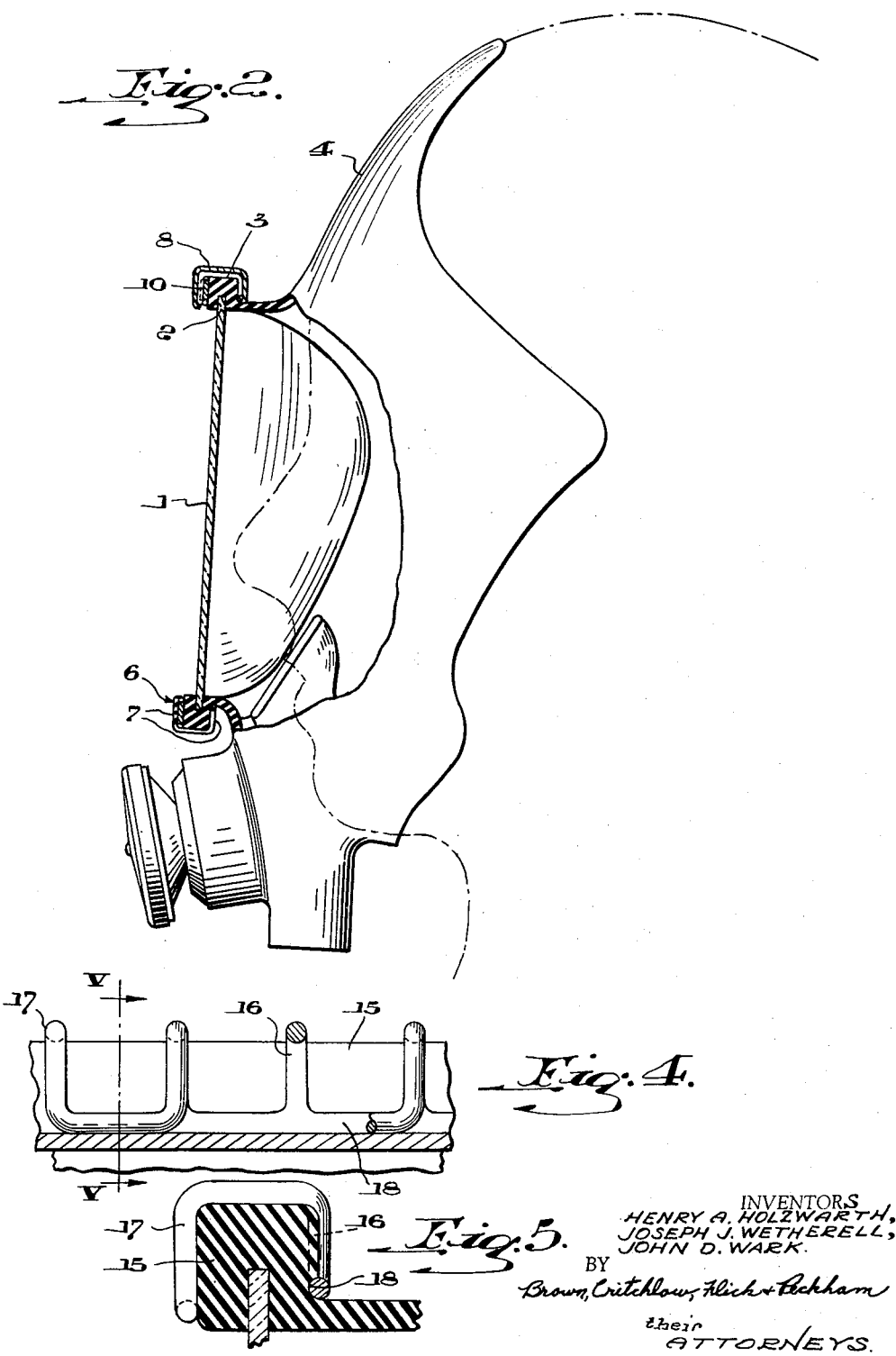

2,956,474
LENS RETAINER

Henry A. Holzwarth, Levittown, Joseph J. Wetherell, Rego Park, and John D. Wark, Freeport, N.Y., assignors to Mine Safety Appliances Company, Pittsburgh, Pa., a corporation of Pennsylvania Filed July 8, 1958, Ser. No. 747,197

8 Claims. (Cl. 88—57)

This invention relates to frames for lenses, and more particularly to means for clamping a compressible frame against a lens.

There are places in which it is desirable to seal a frame around a lens to prevent gas or liquid from passing around the edge of the lens. This problem is encountered with certain types of goggles and with gas masks. If the lens is flat, there is not much difficulty in clamping the frame tightly around it, but when the edge of the lens is not in a flat plane, it often is difficult to obtain a good seal between the frame and lens. An example of a curved lens is found in a mask that has one large lens extending across the front of it and curved backward at its sides.

It is among the objects of this invention to provide lens retaining means which is simple in construction, which is easy to apply and remove, which insures a good seal, and which readily conforms to lenses and frames of irregular contours.

In accordance with this invention, a compressible frame, such as the frame around the sight opening in a gask mask, has a groove in its inner surface that receives the edge of a lens closing the sight opening. Extending around the outside of the frame is the web of a flexible channel shaped band, which has side flanges overlying the opposite sides of the frame. The side flanges compress the frame between them and press it tightly against the lens. The band is formed from a resilient wire bent back and forth to provide a series of loops that extend across the band alternately in opposite directions. For best results, a relatively stiff strip of material is clamped between one of the flanges of the band and the adjoining side of the frame. This strip may be provided with longitudinally spaced transverse grooves that receive the sides of the overlying loops.

The preferred embodiment of the invention is illustrated in the accompanying drawings; in which Fig. 1 is a front view of a mask provided with our lens retaining means;

Fig. 2 is a side view, partly in vertical section;

Fig. 3 is an enlarged fragmentary perspective view of the flexible band;

Fig. 4 is an enlarged rear view of a short length of a modified lens frame; and

Fig. 5 is a cross section taken on the line V—V of Fig. 4.

Referring to Figs. 1 and 2 of the drawings, a protective lens 1 has its edge mounted in a groove 2 in the inner surface of a sourrounding frame 3. The frame is made of compressible material, such as rubber or the like, and may be carried by any suitable means. The drawings show the frame surrounding the large sight opening in the front of a gas mask 4 with which the frame is integral. The frame projects outward from the opening and therefore has exposed front and rear sides. The lens extends entirely across the front of the mask and is curved backward along its sides to provide for lateral vision.

It is a feature of this invention that the frame is compressed tightly against the marginal portion of the lens in its groove, whereby to form a good seal. Accordingly, the frame is clamped in a flexible channel shaped band 6 of special construction, the web of which extends around the outside of the frame in contact with it. The band straddles the frame; that is, the side flanges of the channel overlie the front and back sides of the frame. If the back of the frame is narrower than the front, the front flange can be made wider than the rear one. The frame is compressed between the flanges of the band and pressed tightly against opposite sides of the curved lens to form a good seal.

As shown best in Fig. 3, the band is formed from a resilient wire which has been bent back and forth to provide a series of loops 7 extending across the band alternately in opposite directions. In other words, the wire has a zigzag appearance. The loops themselves are bent lengthwise of the band to give it its channel-like appearance. Since a band made in this way is very flexible, it can conform to any frame contour with every loop pressing tightly against a side of the frame. The band is easy to apply by merely fitting one end over the frame and then holding that end while the rest of the band is pushed over the frame. Of course, the band is made of such length that after it has been applied to a frame the two ends of the band will more or less meet. They can then be connected together by a clip 8.

Another feature of this invention is that the flexible band is locked in place around the curved lens. Because of the lens curvature, it would be possible otherwise to slip the band off the top or bottom of the frame. To prevent that, a relatively stiff strip 10 is inserted between a flange of the band and the adjoining side of the frame. It may be a thin metal strip of the same shape as the frame and clamped tightly against its front side by the front flange of the band. Of course, the strip is applied to the frame before the band, and it will fit properly in only one position when the lens is not a circle. Guide marks, for example, can be used for positioning the strip on the frame. It is desirable to provide the front of strip 10 with longitudinally spaced, transverse grooves 11 spaced apart the same distance as the sides of the wire loops should be. The loops can therefore lie in these grooves, which form guides for spacing the loops uniformly and correctly as the band is applied to the frame, so that the opposite ends of the band will come together as they should and not overlap or be spaced too far apart. Preferably the wire loops have substantially parallel sides. The connecting ends for the front loops overlap the inner edge of the strip between the grooves and thereby lock the band in place. To obtain a greater degree of overlap, the connecting ends of the loops may be bent backward slightly. This is necessary in case the strip is not provided with grooves.

This flexible band will conform to any contour of the frame, and the pressure of the loops against the strip 10 will be distributed uniformly against the front of the frame all the way around it.

In the modification shown in Figs. 4 and 5, strip 10 is omitted, but the back of the lens frame 15 is provided with a plurality of transverse grooves 16 spaced apart the correct distance for receiving the sides of the loops of the wire band 17. The lower ends of these grooves open into an endless groove 18 that extends entirely around the base of the frame for receiving the straight ends of the rear loops and locking the band in place. The front loops of the band engage flat against the front of the frame. If desired, however, a strip like strip 10, but without transverse grooves for the sides of the loops, can be clamped against the front of the frame by the flexible band.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The combination with a lens and a compressible frame therefor having a groove in its inner surface receiving the edge of the lens, of a flexible channel shape band having a web extending around the outside of the frame and having side flanges overlying the opposite sides of the frame and compressing it between them, said flanges overlapping said groove, the band being formed from a resilient wire bent back and forth to provide a series of loops extending transversely of the band alternately in opposite directions.

2. The combination with a lens and a flexible frame therefor having a groove in its inner surface receiving the edge of the lens, of a relatively stiff strip extending around the lens in engagement with one side of the frame, and a flexible channel shape band having a web extending around the outside of the frame and having side flanges overlying said strip and the opposite side of the frame and overlapping said groove to clamp the frame against the opposite sides of the lens, the band being formed from a resilient wire bent back and forth to provide a series of loops extending transversely of the band alternately in opposite directions.

3. The combination with a lens and a flexible frame therefor having a groove in its inner surface receiving the edge of the lens, of a relatively stiff strip extending around the lens in engagement with one side of the frame, and a flexible channel shape band having a web extending around the outside of the frame and having side flanges overlying said strip and the opposite side of the frame and overlapping said groove to clamp the frame against the opposite sides of the lens, the band being formed from a resilient wire bent back and forth to provide a series of loops extending transversely of the band alternately in opposite directions, and said strip being provided with a plurality of longitudinally spaced transverse grooves receiving the sides of the overlying loops.

4. The combination recited in claim 3, in which said loops have substantially parallel sides and said strip grooves are substantially parallel.

5. The combination with a lens and a compressible frame therefor having a groove in its inner surface receiving the edge of the lens, of a flexible channel shape band having a web extending around the outside of the frame and having side flanges overlying the opposite sides of the frame and compressing it between them, said flanges overlapping said groove, the band being formed from a resilient wire bent back and forth to provide a series of loops extending transversely of the band alternately in opposite directions, one side of the frame being provided with a plurality of longitudinally spaced transverse grooves receiving the sides of the overlying loops.

6. The combination with a lens and a compressible frame therefor having a groove in its inner surface receiving the edge of the lens, of a flexible channel shape band having a web extending around the outside of the frame and having side flanges overlying the opposite sides of the frame and compressing it between them, said flanges overlapping said groove, the band being formed from a resilient wire bent back and forth to provide a series of loops extending transversely of the band alternately in opposite directions, the back side of the frame being provided with a plurality of longitudinally spaced transverse grooves receiving the side of the overlying loops, and said back side also having a continuous groove connecting the inner ends of all of said transverse grooves.

7. The combination with a lens and a flexible frame therefor having a groove in its inner surface receiving the edge of the lens, of a relatively stiff strip extending around the lens in engagement with one side of the frame, and a flexible channel shaped band having a web extending around the outside of the frame and having side flanges overlying said strip and the opposite side of the frame and overlapping said groove to clamp the frame against the opposite sides of the lens, the band being formed from a series of resilient wire loops having U-shaped portions overlying said strip and also having substantially parallel portions extending across the outside of the frame and inwardly across the back side of the frame where adjacent loops are connected by wire portions extending lengthwise of the band, and said strip being provided with a plurality of longitudinally spaced transverse grooves receiving the sides of said U-shaped portions.

8. The combination with a lens and a compressible frame therefor having a groove in its inner surface receiving the edge of the lens, of a flexible channel shaped band having a web extending around the outside of the frame and having side flanges overlying the opposite sides of the frame and compressing it between them, said flanges overlapping said groove, the band being formed from a series of resilient wire loops having U-shaped portions overlying the front side of the frame and also having substantially parallel portions extending across the outside of the frame and inwardly across the back side of the frame where adjacent loops are connected by wire portions extending lengthwise of the band.

References Cited in the file of this patent

UNITED STATES PATENTS

| | | |
|---|---|---|
| 1,385,583 | Parsons | July 26, 1921 |
| 2,158,693 | Dym | May 16, 1939 |
| 2,359,506 | Battley et al. | Oct. 3, 1944 |
| 2,375,147 | Teague | May 1, 1945 |

FOREIGN PATENTS

| | | |
|---|---|---|
| 706,966 | Great Britain | Apr. 7, 1954 |